US011574617B2

(12) United States Patent
Rouby et al.

(10) Patent No.: US 11,574,617 B2
(45) Date of Patent: Feb. 7, 2023

(54) MECHANICAL WARNING DEVICE FOR A VEHICLE, FOR EXAMPLE PARTICULARLY FOR A VELOCIPEDE

(71) Applicant: HERMES SELLIER, Paris (FR)

(72) Inventors: Eric Rouby, Montfort L'Amaury (FR); Doan Vu Truong, Ivry sur Seine (FR)

(73) Assignee: HERMES SELLIER, Paris (FR)

( * ) Notice: Subject to any disclaimer, the term of this patent is extended or adjusted under 35 U.S.C. 154(b) by 914 days.

(21) Appl. No.: 16/421,668

(22) Filed: May 24, 2019

(65) Prior Publication Data

US 2019/0359275 A1 Nov. 28, 2019

(30) Foreign Application Priority Data

May 28, 2018 (FR) ...................................... 1854529

(51) Int. Cl.
| | | |
|---|---|---|
| B62J 3/00 | (2020.01) | |
| G10K 1/071 | (2006.01) | |
| G10K 1/072 | (2006.01) | |
| B62J 3/04 | (2020.01) | |
| G10K 1/063 | (2006.01) | |

(52) U.S. Cl.
CPC ................ *G10K 1/071* (2013.01); *B62J 3/04* (2020.02); *G10K 1/063* (2013.01); *G10K 1/072* (2013.01)

(58) Field of Classification Search
CPC ........ G01K 1/063; G01K 1/071; G01K 1/072; B62J 3/04
See application file for complete search history.

(56) References Cited

U.S. PATENT DOCUMENTS 4,466,329 A     8/1984  Hayward

FOREIGN PATENT DOCUMENTS

| CN | 207 292 224 U | 5/2018 | |
| EP | 3 199 436 A1 | 10/1986 | |
| EP | 3199436 A1 * | 8/2017 | ................ B62J 3/04 |
| KR | 2011 0008764 A | 1/2011 | |

OTHER PUBLICATIONS

Borman, S., "Eluent, Effluent, Eluate, and Eluite", Analytical Chemistry, vol. 59, No. 2, Jan. 15, 1987, pp. 99A.*
FR Search Report, dated Jan. 31, 2019, from corresponding FR1854529 application.

* cited by examiner

*Primary Examiner* — Daniel S Larkin
(74) *Attorney, Agent, or Firm* — Nixon & Vanderhye

(57) ABSTRACT

A mechanical warning device (1) for a vehicle, including for a velocipede, includes a body (2), a ringer (3) mounted on the body, a striker (4) movably mounted on the body and relative to the ringer, and a magnet mechanism (5) which is configured such that, when the striker is displaced from a stable position to an intermediate position in which it has been displaced away from the ringer, it drives the striker from the intermediate position to strike the ringer then brings the striker back into the stable position.

17 Claims, 5 Drawing Sheets

MECHANICAL WARNING DEVICE FOR A VEHICLE, FOR EXAMPLE PARTICULARLY FOR A VELOCIPEDE

FIELD OF THE INVENTION

The invention concerns a mechanical warning device for a vehicle, for example particularly for a velocipede, also more commonly called a bell.

The invention also concerns such a vehicle, for example particularly a velocipede, provided with such a mechanical warning device.

The term velocipede may designate a vehicle propelled at least in part by its rider.

TECHNOLOGICAL BACKGROUND

Mechanical warning devices for a vehicle are known, for example particularly for a velocipede, and in particular bells, provided with a mounting, with a ringer mounted on that mounting, with a striker movably mounted on the mounting and configured to strike the ringer when that striker is manually actuated, and with a return member cooperating with the striker to bring it back into a stable position after it has been manually actuated and has struck the ringer.

The return member is conventionally formed by a spring which compresses and relaxes each time the striker is manually actuated. Furthermore, the spring is subjected to the force applied by the user when the latter actuates the striker manually.

Other warning devices for a vehicle are known, for example particularly for a velocipede, which are electrically actuated rather than mechanically or which are entirely electric.

SUBJECT OF THE INVENTION

The invention is directed to providing a mechanical warning device for a vehicle, in particular for a velocipede, which is particularly simple and convenient both in terms of manufacture and use and which is also particularly reliable and durable.

According to a first aspect, the invention thus relates to a mechanical warning device for a vehicle, for example particularly for a velocipede, comprising a body, a ringer mounted on said body and a striker movably mounted on said body and relative to said ringer, characterized in that it further comprises a magnet mechanism which is configured such that, when said striker is displaced from a stable position to an intermediate position in which it has been displaced away from said ringer, it drives said striker from said intermediate position to strike said ringer then brings said striker back into said stable position.

In other words, the magnet mechanism allows the displacement of the striker to strike the ringer and ensures its return to the stable position.

Such a magnet mechanism is particularly convenient and durable since it is not directly subjected to the force applied to the striker to move it from the stable position to the intermediate position.

Furthermore, such a magnet mechanism is not subjected to structural and mechanical wear as may be a spring as described in the devices of the prior art.

Therefore, by virtue of the magnet mechanism which the mechanical warning device comprises, the latter is particularly reliable while remaining particularly simple.

According to other preferred features of the device according to the invention that are particularly simple, convenient and economical:

said magnet mechanism comprises at least one first magnet accommodated in said striker and at least one second magnet accommodated in said body;

said at least one first magnet and said at least one second magnet are arranged so as naturally to bring said striker into its stable position;

said striker is rotatably mounted relative to said body;

said body is provided with a stop against which said striker comes into contact when it strikes said ringer and which enables the return of said striker into the stable position without again striking said ringer;

said body and said ringer are configured in order for said ringer to be mounted in immediate proximity to said stop;

said mechanical warning device is configured such that said striker is at a predetermined distance from said stop in the stable position; whereby, when said striker is in the intermediate position, it is displaced away from said ringer and from said stop, when said striker is released from its intermediate position, said magnet mechanism drives said striker from its intermediate position, beyond its stable position, until it comes into contact with said stop and strikes said ringer, and when said striker has struck said ringer, said magnet mechanism brings said striker back into its stable position without striking said ringer again;

said body is provided with a loop having a housing in which is at least partly housed said striker and from which projects one end of said striker for it to be gripped;

said body is provided with a base for its mounting on some particular mounting, for example the handle bars of a velocipede;

said base and said loop are at a distance from each other, forming an interruption in said body, for example for its mounting on said particular mounting;

said body is of generally annular shape and said ringer is of generally elongated and curved shape;

said ringer is mechanically connected to said body with a freedom of movement that allows it to vibrate relative to said body when it is struck by said striker;

said mechanical warning device is provided with at least one mounting pin projecting from one of said ringer and said body, and with at least one first accommodation provided in the other of said body and said ringer to receive said mounting pin; and said mechanical warning device is further provided with at least one elastic return member interposed between said ringer and said body; and/or said body comprises a first shell and a second shell assembled together with said first shell.

According to a second aspect, the invention also relates to a vehicle, for example particularly a velocipede, provided with a mechanical warning device as described above which is mounted on some particular mounting of said velocipede.

BRIEF DESCRIPTION OF THE DRAWINGS

The disclosure of the invention will now be continued with the description of an example embodiment, given below by way of illustrative and non-limiting example, with reference to the accompanying drawings, in which.

DETAILED DESCRIPTION OF AN EMBODIMENT

Figure 1:
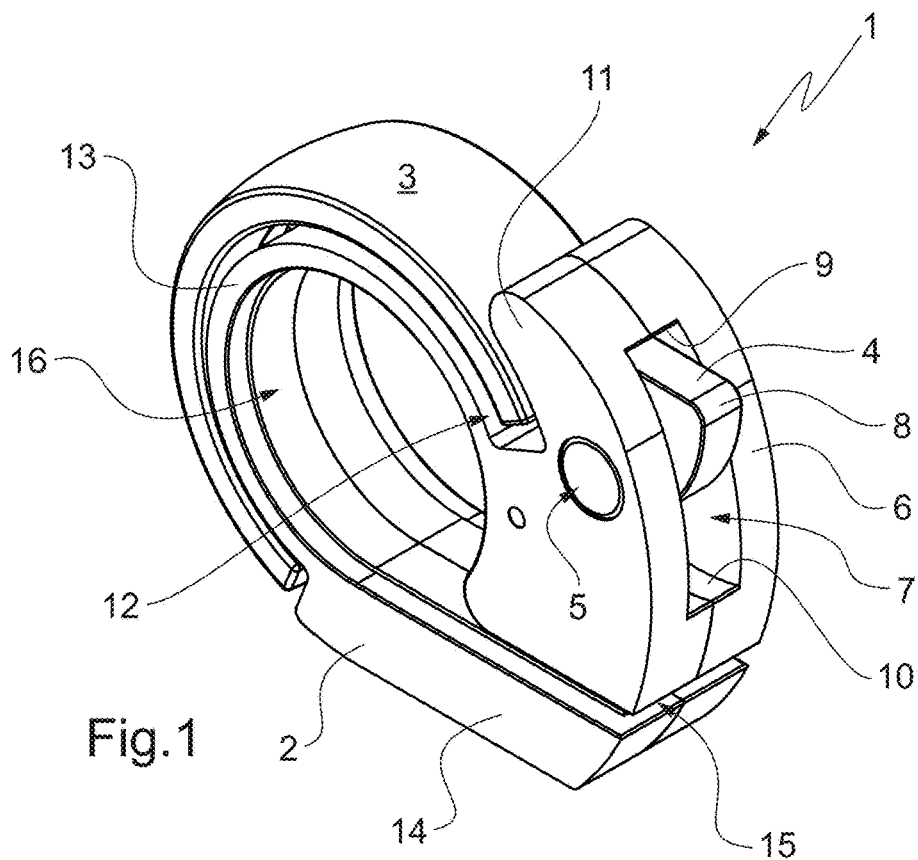
FIGS. 1 and 2 represent diagrammatically in perspective a mechanical warning device for a velocipede, respectively in a stable position and in an intermediate position of a striker which it comprises.
Figure 2:
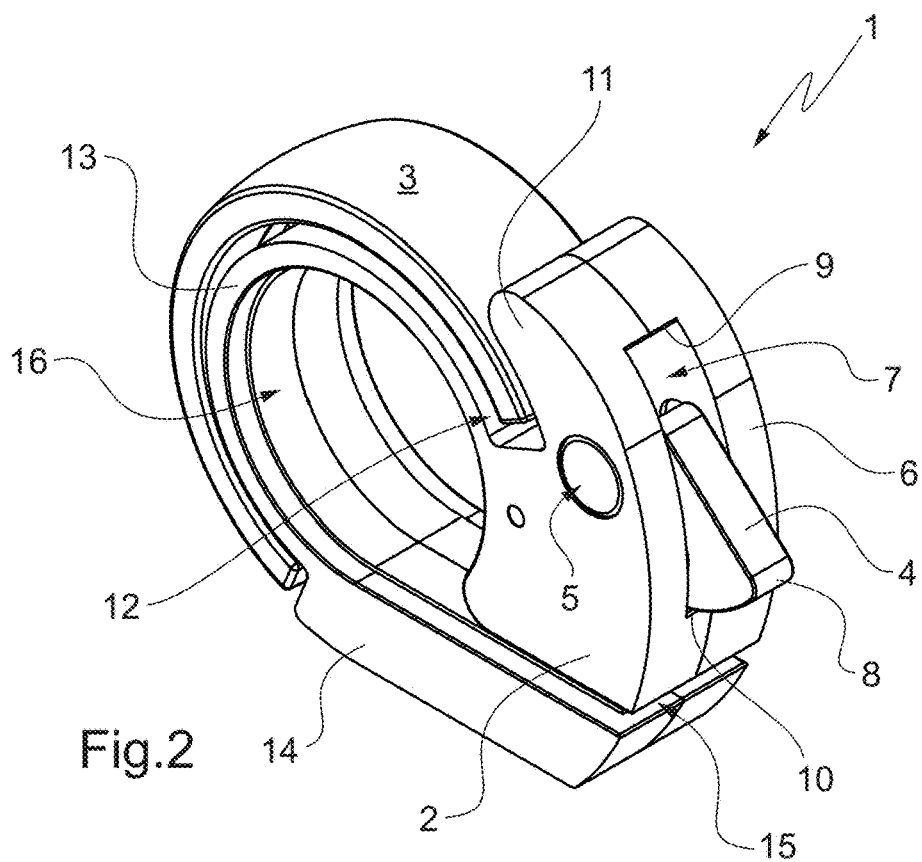

FIGS. 1 and 2 show a mechanical warning device 1 for a vehicle, for example particularly of the velocipede type, which is more commonly called a bell or a warning bell.

The bell 1 comprises a body 2, a ringer 3 mounted on the body 2, as well as a striker 4 movably mounted on the body 2 relative to the ringer 3.

In FIG. 1, the striker 4 of the bell 1 is shown in a stable position, whereas in FIG. 2, the striker 4 of the bell 1 is shown in an intermediate position.

To pass from the stable position to the intermediate position, the striker 4 has been manually actuated by a user, in order to strike the ringer 3 with the striker 4 to send a warning signal, here a sound.

The bell 1 comprises a magnet mechanism 5 which is configured such that, when the striker 4 is displaced from its stable position to its intermediate position in which it is displaced away from the ringer 3, it drives the striker 4 from the intermediate position to strike the ringer 3 then return the striker 4 into its stable position (see below).

The body 2 is of generally annular shape and the ringer 3 is of generally elongated and curved shape.

The ringer 3 is mechanically connected to the body 2 with a freedom of movement that allows it to vibrate relative to the body 2 when it is struck by said striker 4 (see below).

The body 2 is provided with a loop 6 having a housing 7 in which is at least partly housed the striker 4 and from which projects a first end 8 of the striker 4 for it to be gripped in order to be actuated.

The body 2 is provided with a first stop 9 formed in the loop 6, at a first end of the housing 7, and with a second stop 10 also formed in the loop 6, at a second end of the housing 7 which is an opposite end to the first end.

When the striker 4 is in its stable position, it is at a predetermined distance from the first stop 9 (FIG. 1).

When the striker 4 is in its intermediate position, it comes into contact with and abuts the second stop 10 (FIG. 2). In other words, the striker 4 is located at a distance from and displaced away from the first stop 9.

When the striker 4 has just struck the ringer 3, it also comes into contact with and abuts the first stop 9 (see below).

In other words, the striker 4 is movable here in the housing 7 of the loop 6, between the first stop 9 and the second stop 10.

The first stop 9 and the predetermined distance which separates it from the striker 4 when the latter is in the stable position, enables the magnet mechanism 5 to bring the striker 4 back into its stable position after it has struck the ringer 3, this being without it again striking the latter.

It will be noted that the body 2 and the ringer 3 are configured in order for the ringer 3 to be mounted in immediate proximity to the first stop 9.

In particular, the loop 6 forms, at the location of the first stop 9, a protrusion 11 thereby defining a space 12 between a generally annular wall 13 of the body 2 and that protrusion 11. The ringer 3 is partially inserted into this space 12.

The body 2 is provided with a base 14 for its mounting on some particular mounting, for example the handle bars of a velocipede (not shown).

The base 14 and the loop 6 are at a distance from each other, forming an interruption 15 in the body 2, for example for its mounting on the particular mounting.

The body 2 is configured such that the generally annular wall 13 is connected by a first end to the loop 6, and by a second end, which is an opposite end to the first end, to the base 14.

The interruption 15 in the body 2 enables access to an aperture 16 defined by the generally annular shape of the body 2.

Figure 3:
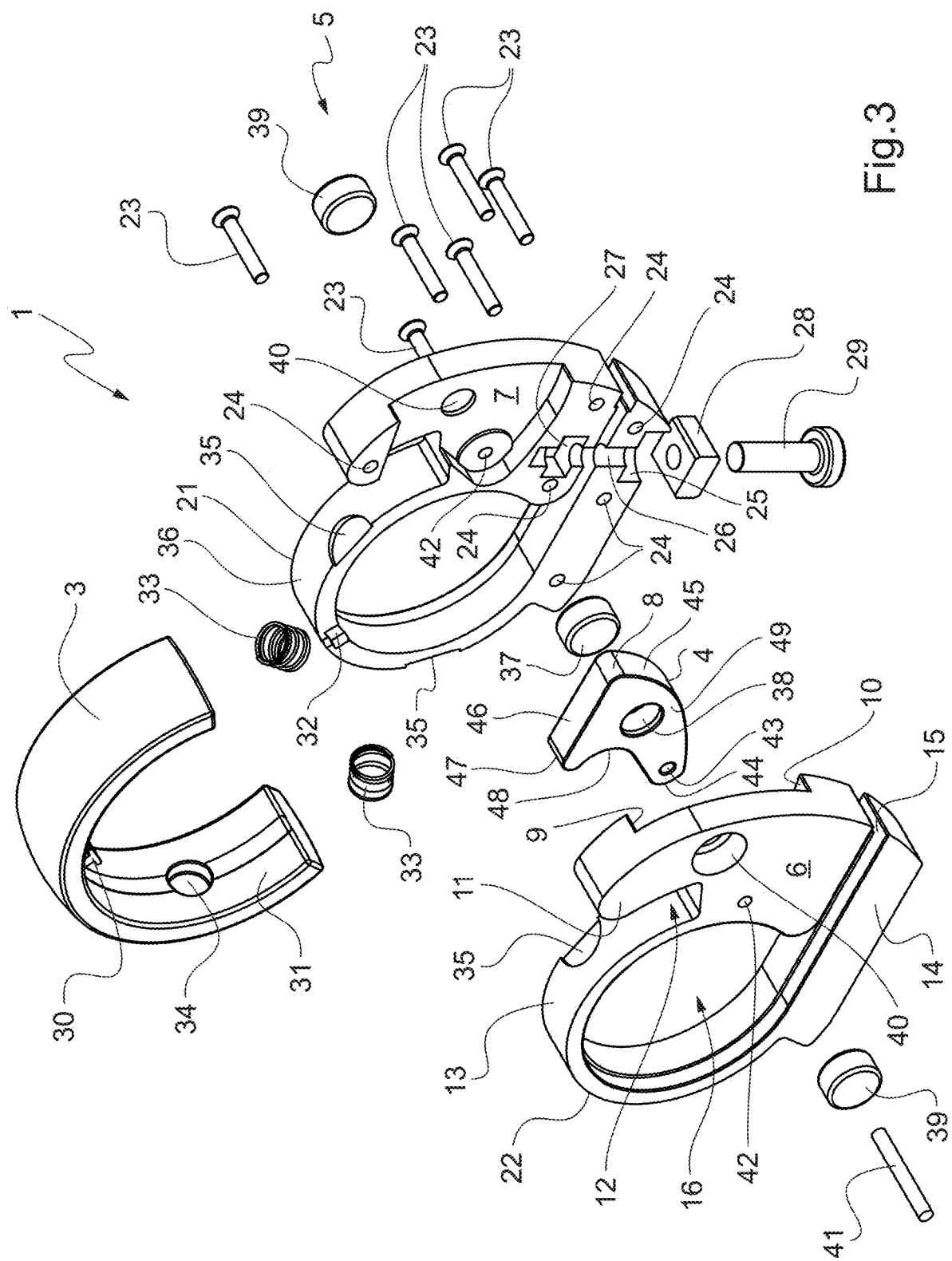
FIG. 3 represent diagrammatically in exploded perspective view the mechanical warning device of FIGS. 1 and 2.

A description will now be given in more detail of the bell 1 with reference to FIG. 3 in which that bell 1 is shown in exploded perspective view.

The body 2 is formed from a first shell 21 and from a second shell 22 configured to be assembled with the first shell 21 via first fastening members 23, by screws or rivets, inserted into bores 24 provided in the first and second shells 21 and 22.

The body 2 is provided with a first aperture 25, for example of generally rectangular shape, provided in the base 14 of each of the first and second shells 21 and 22.

The body 2 is also provided with a second aperture 26, for example of generally circular shape, also provided in the base 14 of each of the first and second shells 21 and 22, and extending the first aperture 25 to open into the interruption 15 of the body 2.

The body 2 is also provided with a third aperture 27, for example having a circular portion, then a rectangular portion then another circular portion, that is provided in the loop 6 of each of the first shell 21 and second shell 22, and opens into the interruption 15 of the body 2 facing the second aperture 26.

The bell 1 comprises a second fastening member, for example formed by a nut 28 and a screw 29 which are configured to be inserted respectively into the first aperture 25 and into the second aperture 26 and third aperture 27 of the body 2; for the tight mounting of the bell on the particular mounting.

The bell 1 is provided with a mounting pin 30, for example T-shaped, which projects from an inside face 31 of the ringer 3.

The body 2 is provided with a first accommodation 32 formed in the generally annular wall 13 of each of the first shell 21 and second shell 22, and which is provided to receive the mounting pin 30 for the mechanical connection of the ringer 3 to the body 2.

The bell 1 is furthermore provided with elastic return members 33, for example helical springs, interposed between the ringer 3 and the body 2.

The body 2 is provided with second accommodations 35 provided on an outside face 36 of the generally annular wall 13 of each of the of the first shell 21 and second shell 22, and the ringer 3 is provided with complementary accommodations 34 provided on its inside face 31.

The second accommodations 35 of the body 2 and the complementary accommodations 34 of the ringer 3 are arranged in pairwise facing arrangement and partially receive the helical springs 33 to allow the vibration of the ringer 3 when it has been struck by the striker 4.

The magnet mechanism 5 comprises a first magnet 37 accommodated in a first recess 38 provided in the striker 4.

The magnet mechanism 5 comprises second magnets 39 housed in second recesses 40 provided in each of the first and second shells 21 and 22 of the body 2.

The first magnet 37 and the second magnets 39 are arranged so as to bring the striker 4 naturally back into its stable position.

In other words, in the stable position of the striker 4, the first magnet 37 and the second magnets 39 are substantially aligned.

This also means that when the striker 4 is moved from its stable position and the first magnet 37 and the second magnets 39 are thus no longer aligned, they tend to bring the striker 4 back into its stable position.

The bell 1 is also provided with a rod here in the form of a pin 41, which is inserted into a through-aperture 42 provided in each of the first shell 21 and second shell 22 of the body 2.

The striker 4 is rotatably mounted around the pin 41 and thus relative to the body 2. For this, the striker 4 is here provided with an aperture 43 within and through which passes the pin 41.

The striker 4 here has a general shape with three sides, of which a first side 45 is, for example, curved and extends between the first end 8 and a second end 44 of the striker 4.

The aperture 43 of the striker 4 is provided here substantially at the location of this second end 44 of this striker 4.

The first side 45 of the striker 4 is configured to come to bear against the second stop 10 of the loop 6, in the intermediate position of the striker 4.

The striker 4 comprises a second side 46 which is, for example, straight and which extends between the first end 8 and a third end 47 of the striker 4.

The second side 46 of the striker 4 is configured to come to bear against the first stop 9 of the loop 6, when the striker 4 strikes the ringer 3.

The striker 4 comprises a third side 48 which is, for example, curved and which extends between the second end 44 and the third end 47 of the striker 4.

This third side 48 has a shape enabling it to avoid the portion of the body 2 in which is formed the space 12 for receiving part of the ringer 3.

The first recess 38 of the striker 4 provided for accommodating the first magnet 37 is positioned substantially at the center of the striker 4 and is open on opposite sides of the lateral faces 49 of the latter.

As mentioned above, when the striker 4 is in its stable position, it is at a predetermined distance from the first stop 9.

Figure 4:
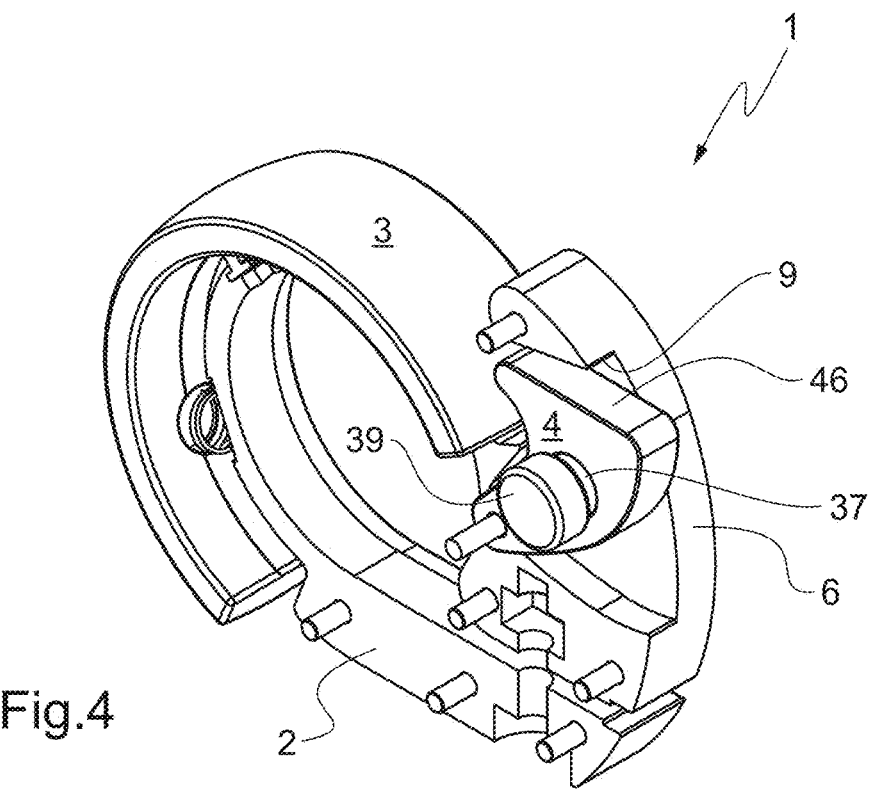
FIGS. 4 and 5 are partial views, respectively in perspective and from the side, of the mechanical warning device in the stable position of the striker.
Figure 5:
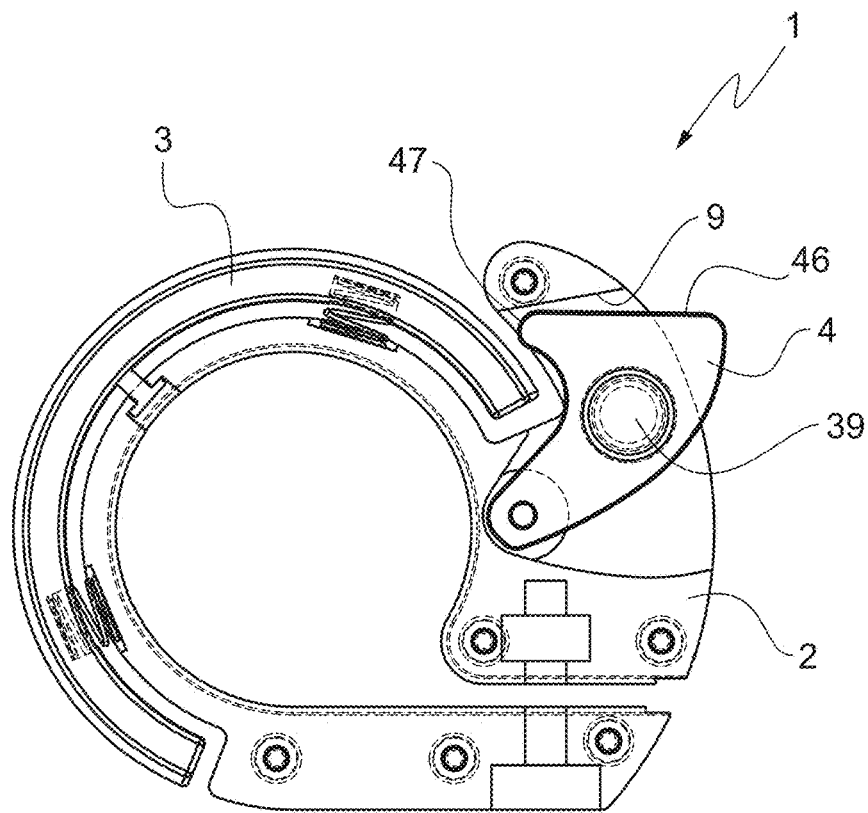

More particularly, in FIGS. 4 and 5, the striker 4 is shown with its second side 46 facing and at a predetermined distance from the first stop 9 formed on the loop 6 of the body 2.

It is to be noted that in the illustrated example, it is the third end 47 of the striker 4 which is located closest to and in immediate proximity to the first stop 9 of the ringer 3, while remaining at a distance from the latter. In the illustrated example, the predetermined distance is thus relatively small.

In the stable position of the striker 4, the first magnet 37 which it accommodates is aligned with the second magnets 39 (only one is visible) which are accommodated in the body 2. This is an equilibrium position obtained by virtue of the magnet mechanism.

When the striker 4 is in the intermediate position, it is manually displaced away from the ringer 3 and from the first stop 9 and comes into contact with the second stop 10.

Figure 6:
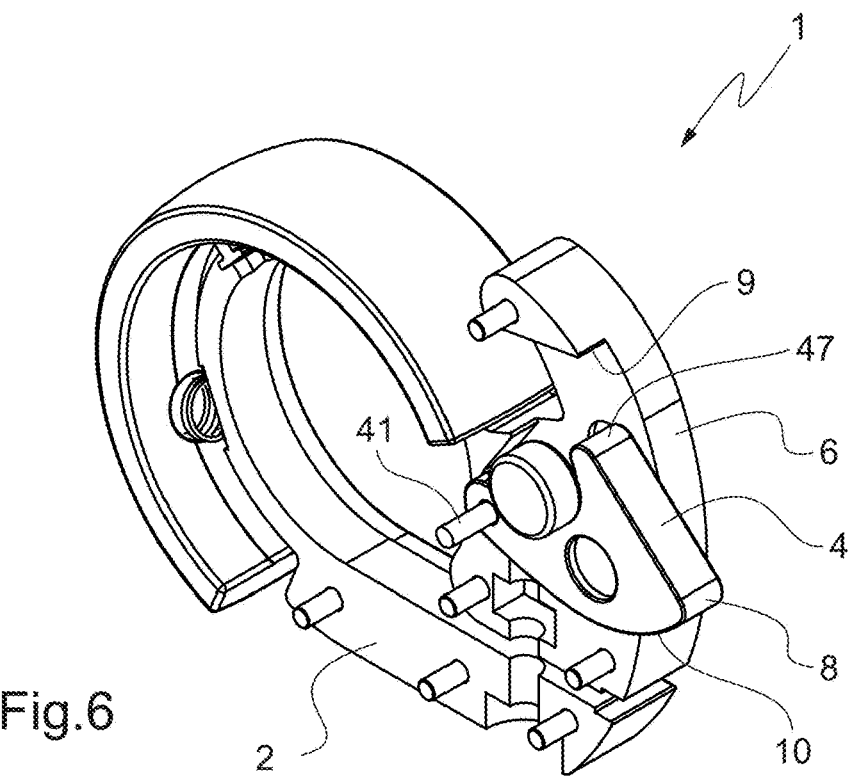
FIGS. 6 and 7 are partial views, respectively in perspective and from the side, of the mechanical warning device in the intermediate position of the striker.
Figure 7:
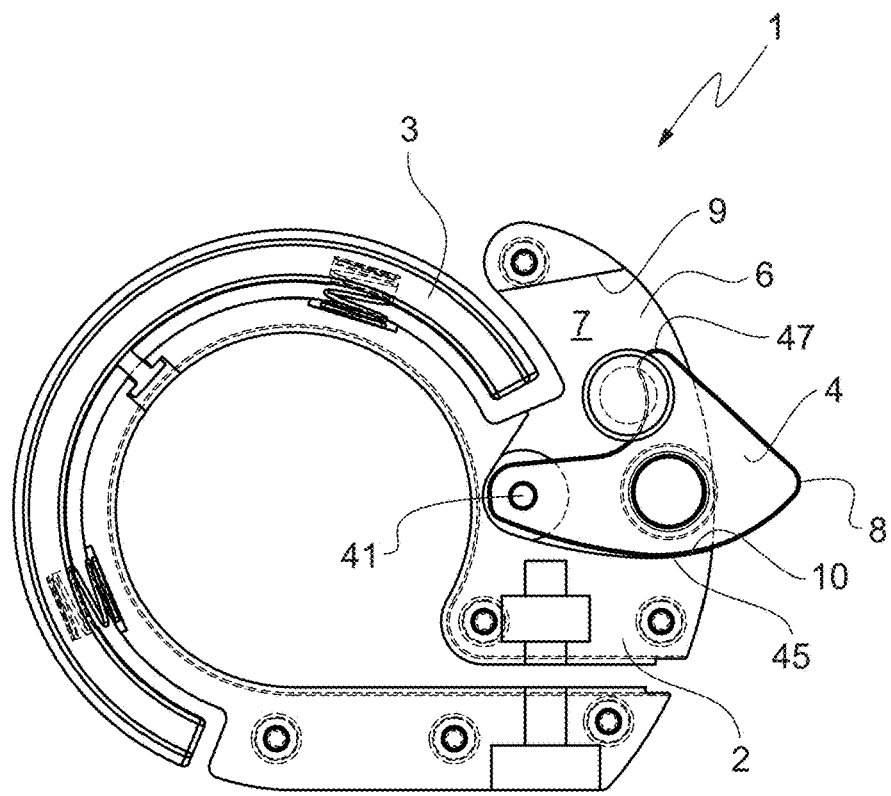

More particularly, in FIGS. 6 and 7, the striker 4 has been rotationally displaced, by its first end 8, around the pin 41.

The striker 4 is thus shown with its first side 45 which comes into contact with the second stop 10 formed on the loop 6 of the body 2.

In other words, the striker 4 has its second side 46 no longer facing the first stop 9 and the third end 47 no longer in immediate proximity to that first stop. It is moreover instead the third side 48 of the striker 4 which is substantially facing the first stop 9 on account of the rotation of the striker 4.

The striker 4 is thus displaced away from and located at a distance from the ringer 3.

The fact of displacing the striker 4 within the housing 7 of the loop 6 moves the first magnet 37 out of alignment with the second magnets 39, which creates an imbalance and thus a return force on the striker 4.

When the striker 4 is released from its intermediate position, the magnet mechanism 5 drives the striker 4 from its intermediate position, beyond its stable position, until it comes into contact with the first stop 9 and strikes the ringer 3.

Figure 8:
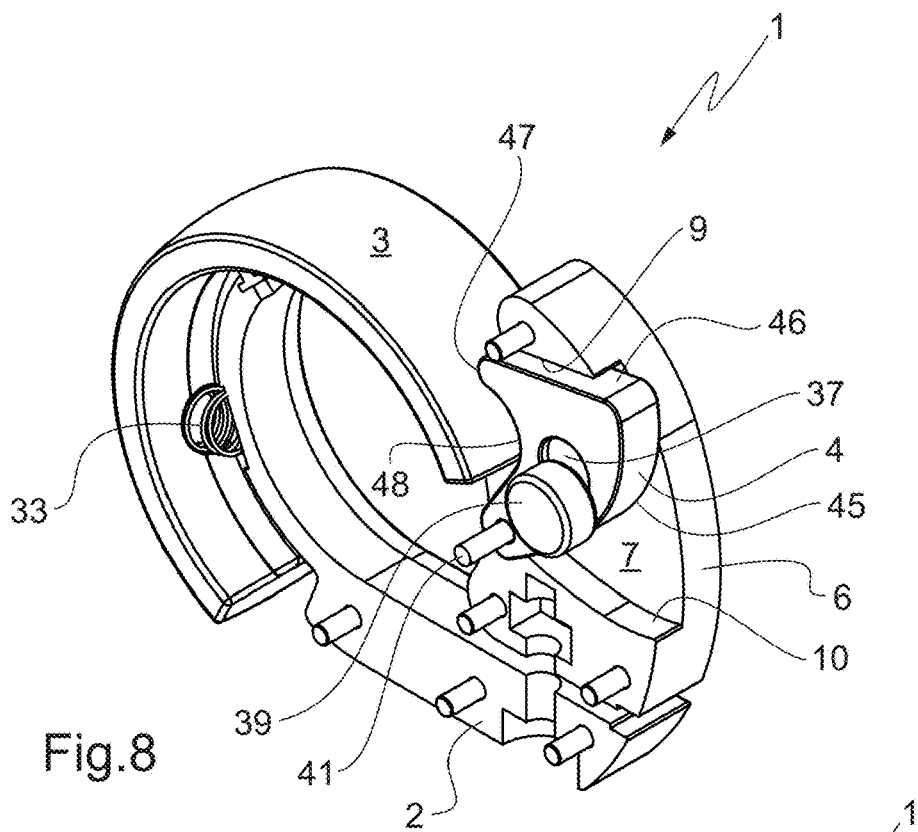
FIGS. 8 and 9 are partial views, respectively in perspective and from the side, of the mechanical warning device in a position of the striker in which it strikes a ringer of the device.
Figure 9:
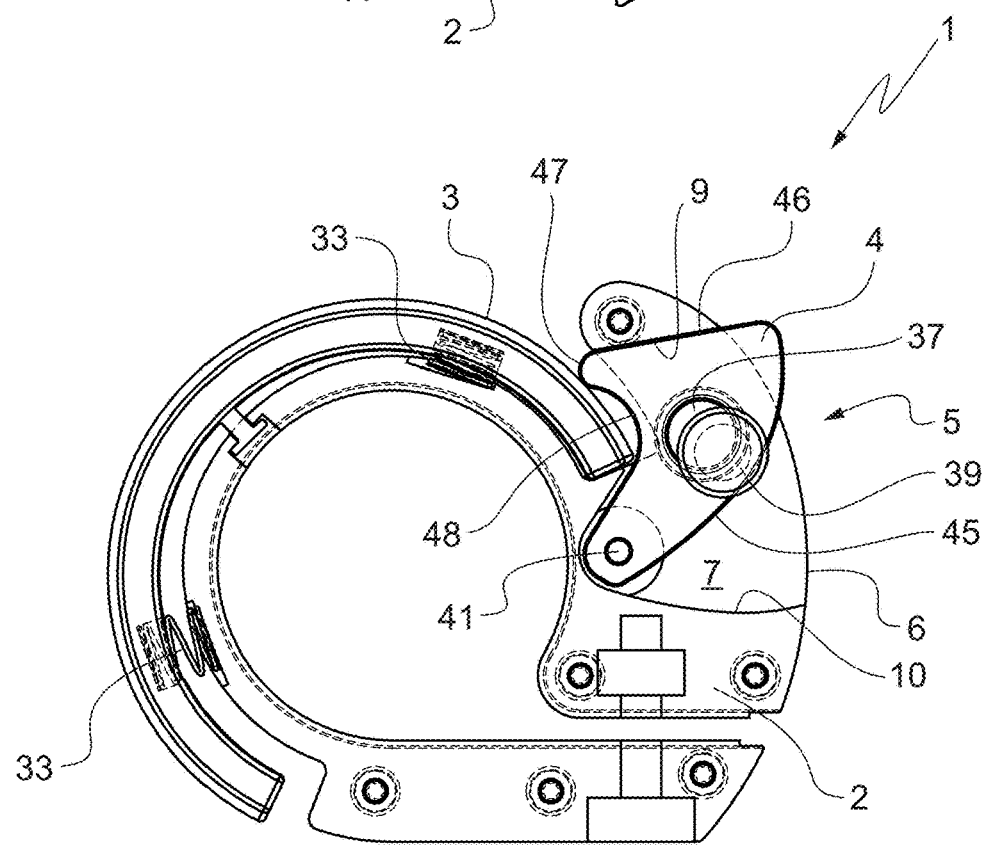

More particularly, in FIGS. 8 and 9, the striker 4 has been rotationally displaced in the housing 7 of the loop 6, around the pin 41, under the effect of the attractive force between the first magnet 37 and the second magnets 39.

Through inertia, the striker 4 does not stop in its stable position but goes beyond until its second side 46 comes into contact with the first stop 9 on the loop 6 of the body 2.

In this position, the third end 47 and the third side 48 of the striker 4 come into contact and strike the ringer 3.

In other words, the striker 4 has its first side 45 displaced away and therefore no longer in contact with the second stop 10.

When the striker 4 abuts the first stop 9 and has struck the ringer 3, the magnet mechanism 5 brings the striker 4 back into its stable position without striking the ringer 1 again (see FIGS. 4 and 5).

This is facilitated by the fact that, as mentioned above, the predetermined distance between the first stop 9 and the striker 4 in the stable position is relatively small and therefore, due to the fact that the magnet 37 is relatively close to (or not too far from) the second magnets 39 when the striker 4 is against the first stop 9 and strikes the ringer 3; such that the equilibrium position of the magnet mechanism 5 is easily attained again. This makes it possible to let the ringer 3 vibrate, thanks to the springs 33, after having struck it with the striker 4.

In other words, the magnet mechanism 5 allows the displacement of the striker 4 to strike the ringer 3 and ensures its return to the stable position.

Such a magnet mechanism 5 is particularly convenient and durable since it is not directly subjected to the force applied to the striker 4 to move it from the stable position to the intermediate position.

What is more, such a magnet mechanism 5 is not subjected to structural and mechanical wear.

Therefore, by virtue of the magnet mechanism 5 which the bell 1 comprises, the latter is particularly reliable while still being particularly simple.

In variants that are not illustrated:

the body has no loop with a first stop;

the body is not generally annular, but instead is rectangular or has another shape;

the body does not have an interruption between the loop and the base;

the body does not have a base and is configured to have an insertion fit or clip mounting to some particular mounting, thanks to its generally annular wall;

the ringer has a different shape, for example, a substantially hemispherical shape, or else rather the shape of a straight metal bar, or for instance another shape;

the fastening of the ringer onto the body is different, and is, for example, a mounting without any spring or on the contrary only by springs;

the magnet mechanism comprises more than a first magnet and second magnets, for example, a plurality of magnets accommodated in the striker and in the loop, or on the contrary, a single magnet in the striker and a single magnet in the loop;

the striker is not rotary within the housing of the loop but instead slides;

the striker has a first side that is straight rather than curved and/or a second side that is curved rather than straight;

the striker does not have a triangular shape but a crescent shape instead;

the warning device comprises an actuator to drive the striker from its stable position towards its intermediate position;

in its intermediate position, it is possible for the striker not to come into contact with the second stop; and/or the bell is more particularly mounted on a bicycle, on a tricycle, on a push scooter or for instance on a pedal car.

It should be noted more generally that the invention is not limited to the examples described and represented.

The invention claimed is:

1. A mechanical warning device for a vehicle, comprising:
a body;
a ringer mounted on said body;
a striker movably mounted on said body and relative to said ringer; and
a magnet mechanism which is configured such that, when said striker is displaced from a stable position to an intermediate position in which said striker has been displaced away from said ringer, the magnet mechanism drives said striker from said intermediate position to strike said ringer and then brings said striker back into said stable position.

2. The device according to claim 1, wherein said magnet mechanism comprises at least one first magnet accommodated in said striker and at least one second magnet accommodated in said body.

3. The device according to claim 2, wherein the at least one first magnet and said at least one second magnet are arranged so as naturally to bring said striker into the stable position.

4. The device according to claim 1, wherein said striker is rotatably mounted relative to said body.

5. The device according to claim 1, wherein said body is provided with a stop against which said striker comes into contact when the striker strikes said ringer and which enables the return of said striker into the stable position without again striking said ringer.

6. The device according to claim 5, wherein said body and said ringer are configured in order for said ringer to be mounted in immediate proximity to said stop.

7. The device according to claim 5, wherein the device is configured such that said striker is at a predetermined distance from said stop in the stable position, whereby:

when said striker is in the intermediate position, said striker it is displaced away from said ringer and from said stop, when said striker is released from the intermediate position, said magnet mechanism drives said striker from the intermediate position, beyond the stable position, until said striker comes into contact with said stop and strikes said ringer, and when said striker has struck said ringer, said magnet mechanism brings said striker back into the stable position without striking said ringer again.

8. The device according to claim 1, wherein said body is provided with a loop having a housing in which is at least partly housed said striker and from which projects one end of said striker for gripping said striker.

9. The device according to claim 1, wherein said body is provided with a base for mounting on a mounting element of the vehicle.

10. The device according to claim 9, wherein said base and said loop are at a distance from each other, forming an interruption in said body, for the mounting on said mounting element.

11. The device according to claim 9, wherein the vehicle is a velocipede, and the mounting element are handlebars of said velocipede.

12. The device according to claim 1, wherein said body is of generally annular shape and said ringer is of generally elongated and curved shape.

13. The device according to claim 1, wherein said ringer is mechanically connected to said body with a freedom of movement that allows said ringer to vibrate relative to said body when it is struck by said striker.

14. The device according to claim 13, further comprising:
at least one mounting pin projecting from one of said ringer and said body, and with at least one first accommodation provided in the other of said body and said ringer to receive said at least one mounting pin; and
at least one elastic return member interposed between said ringer and said body.

15. The device according to claim 1, wherein said body comprises a first shell and a second shell assembled together with said first shell.

16. A vehicle, provided with the mechanical warning device according to claim 1, which is mounted on a mounting element of said vehicle.

17. The vehicle according to claim 16, wherein the vehicle is a velocipede.

* * * * *